Sept. 21, 1965  M. S. BERMAN  3,207,262
ARTICLE STORING AND DELIVERING CONVEYOR
Filed March 21, 1960  4 Sheets-Sheet 1

INVENTOR.
MYRON S. BERMAN
BY
Whiteley and Caine

Sept. 21, 1965   M. S. BERMAN   3,207,262
ARTICLE STORING AND DELIVERING CONVEYOR
Filed March 21, 1960   4 Sheets-Sheet 2

INVENTOR.
MYRON S. BERMAN
BY Whiteley and Caine

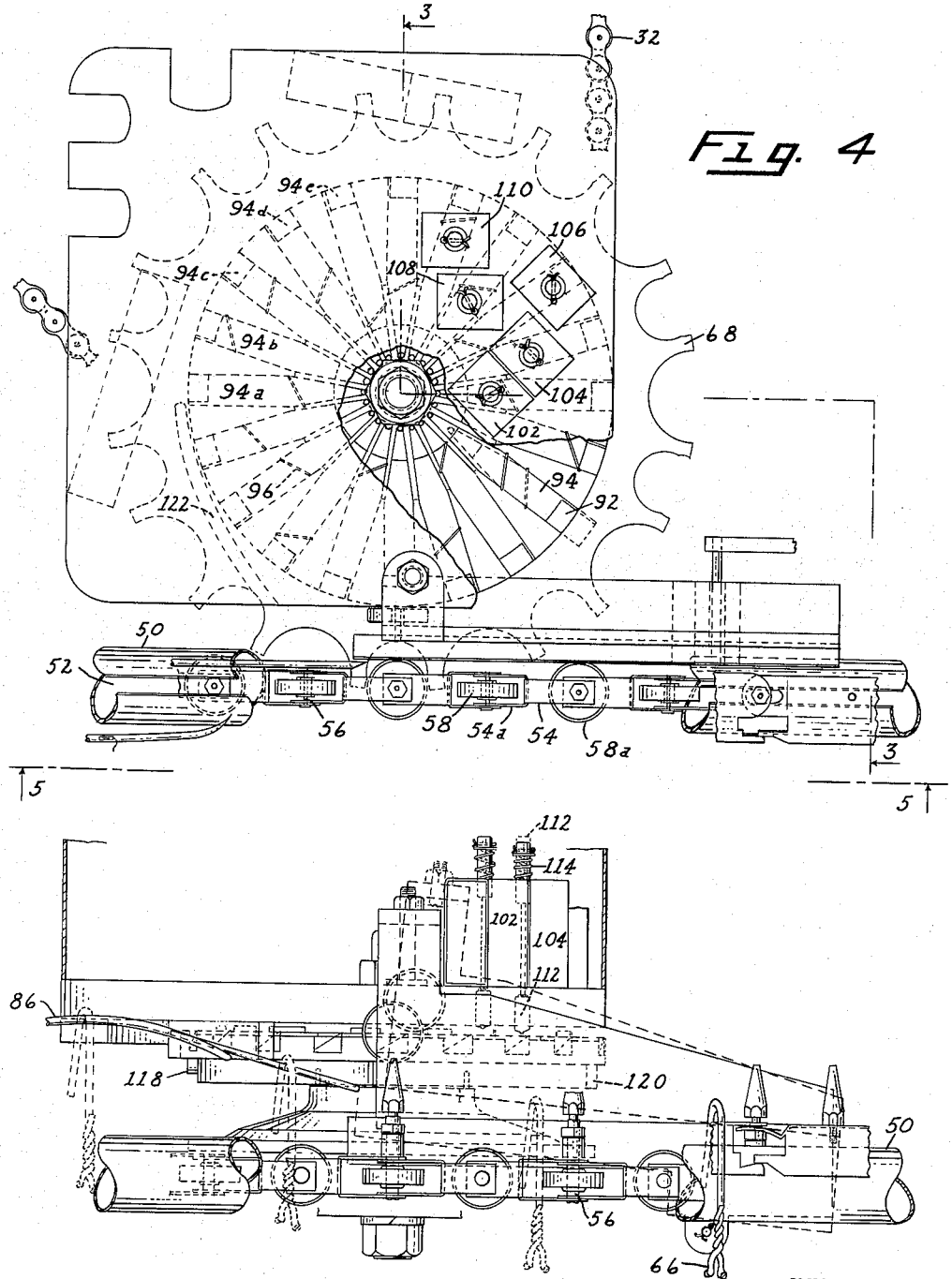

Sept. 21, 1965    M. S. BERMAN    3,207,262
ARTICLE STORING AND DELIVERING CONVEYOR
Filed March 21, 1960    4 Sheets-Sheet 4

INVENTOR.
MYRON S. BERMAN
BY
Whiteley and Caine

United States Patent Office 3,207,262
Patented Sept. 21, 1965

3,207,262
ARTICLE STORING AND DELIVERING CONVEYOR
Myron S. Berman, Minneapolis, Minn., assignor to Vic Manufacturing Company, Minneapolis, Minn., a corporation of Minnesota
Filed Mar. 21, 1960, Ser. No. 16,564
13 Claims. (Cl. 186—16)

This invention relates to improvements in an article storing and delivering conveyor, and the control thereof. In general, the invention is concerned with a system wherein a large number of articles are stored, and when desired, one or more thereof is segregated from the group and delivered to a point of access. More particularly, the invention is concerned with a conveyor system that serves as a normal means of storing articles of apparel or the like, such as cleaned garments and the delivery of an individual article or a group of articles from the conveyor to a point of access.

In the operation of garment cleaning establishments which deal directly with the public, prompt customer service is essential. Many businesses of this type are located at strategic places where customers leave the solied garments and call for the cleaned garments at a later period. The standard practice has been to place the finished garments on various racks segregated by an alphabetical arrangement of customers' names. The counter clerk must, therefore, spend considerable time locating the finished garments. When business is brisk, the absence of the counter clerk from the point of contact with customers not only delays both the receipt and delivery of garments, but is annoying to customers, and increases the cost of the operation. Moreover, the use of stationary storage racks is inefficient and occupies valuable floor space.

In the present invention, one or more conveyors are utilized to store the finished garments, and means are provided to bring pre-selected garments quickly to a point of access. The conveyor forms a mobile storage area, and may be located sufficiently above the floor surface to either make the floor area available for other use, or to accommodate an additional conveyor at the floor level. The conveyor is composed of a multiplicity of individual stations, each of which is adapted to accommodate appropriate means of supporting the finished garments. A control system is provided for operating the conveyor to pre-select the contents of a particular station on the conveyor for prompt delivery to the customer.

An object of the invention is to provide an article carrying conveyor by which many articles can be conveniently stored at selected stations on a conveyor, together with means for delivering therefrom the contents of a pre-selected station.

Another object is to provide a conveyor forming a storage for a large number of independent articles such as garments, together with a delivery track extending in close proximity to the conveyor, and means by which the contents of a pre-selected station can be transferred from the conveyor to said delivery track.

Another object is to provide in combination with a conveyor having a multiplicity of individual stations and a sidetrack, means for transferring the contents of a pre-selected station on the conveyor to the sidetrack, together with an electrical control system that operates the conveyor and the transfer means.

Another object is to provide in combination with a conveyor control system, a corrective means for properly correlating the operation of the control circuit with the conveyor.

A further object is to provide a conveyor that forms the normal storage area for a large number of individual pieces of apparel, together with means by which an individual piece of apparel can be selectively removed from the conveyor and transferred to a sidetrack while the conveyor is in movement.

Other and further objects may become apparent from the following specification and claims, and in the appended drawings in which:

FIG. 4 is an enlarged plan view of a portion of the structure shown in FIG. 2;

FIG. 5 is a section taken on the lines 5—5 of FIG. 4; and

Referring now to the several views of the drawings, the invention will be described in detail.

Figure 1:
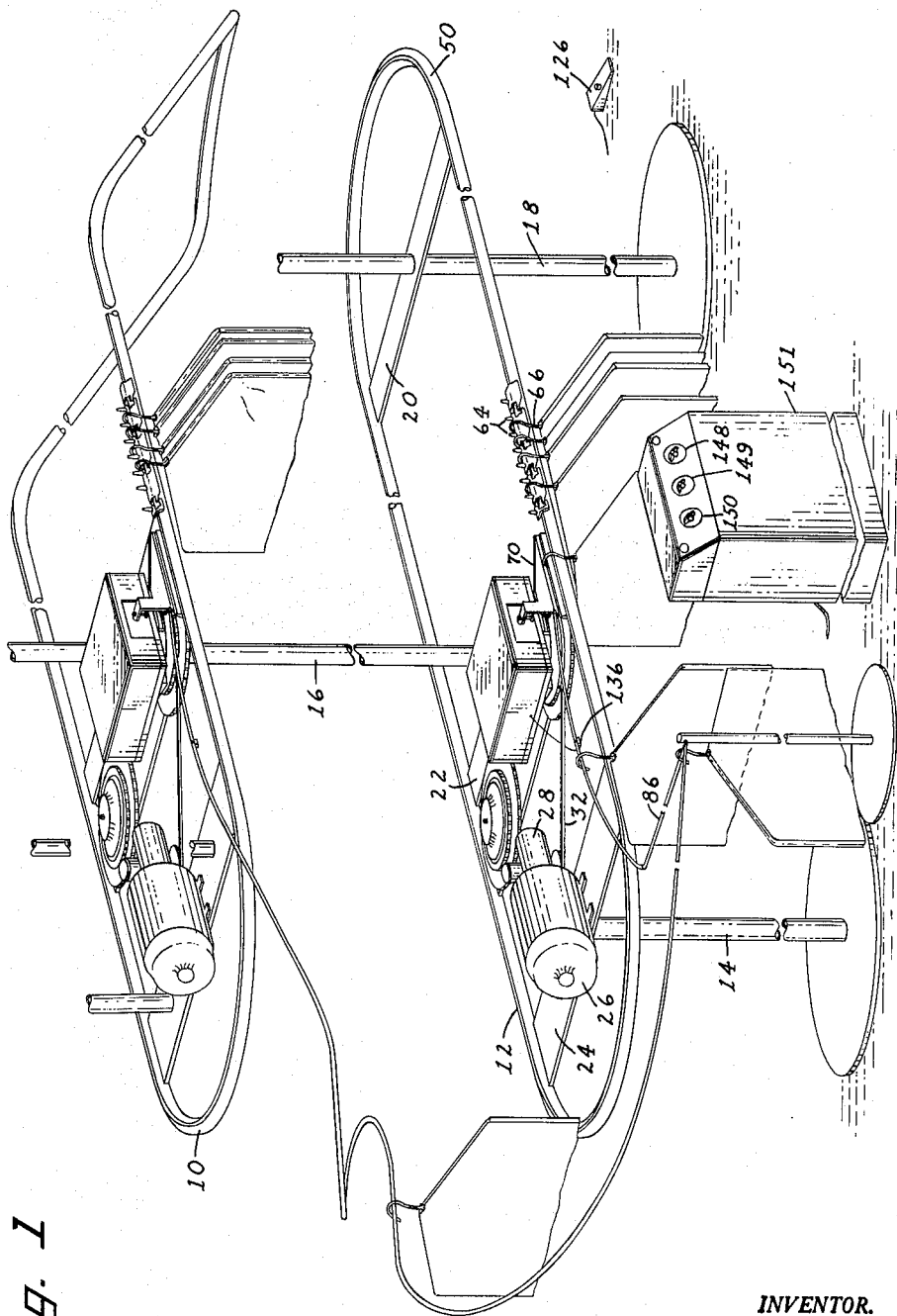
FIG. 1 is an orthographic projection of the conveyor system forming the present invention.

Referring to FIG. 1 are disclosed two independent conveyors disposed in vertical spaced relationship with each other, and each serving an independent function of storing and delivering garments. Each of the conveyors designated respectively at 10 and 12 is supported on standards 14, 16 and 18, by means of crosspieces 20, 22 and 24, discloosed with respect to the conveyor 12, but with similar parts disposed with respect to conveyor 10.

Figure 2:
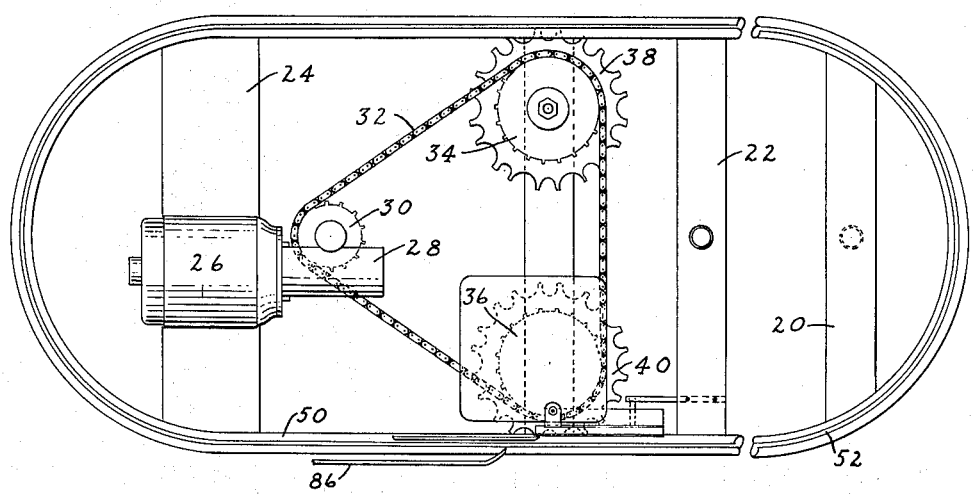
FIG. 2 is a plan view of a part of one of the units shown in FIG. 1, with parts of the conveyor broken away to consolidate the view of the structure.

As best seen in FIG. 2, supported on the crosspiece 24, is a motor 26, which through a reduction gear drive 28, drives a pinion gear 30. A chain 32 extends around the gear 30, and also around other gears 34 and 36. The gears 34, 36, are, in turn, coupled with other gears 38 and 40 for driving a conveyor, to be discussed hereinafter.

Figure 3:
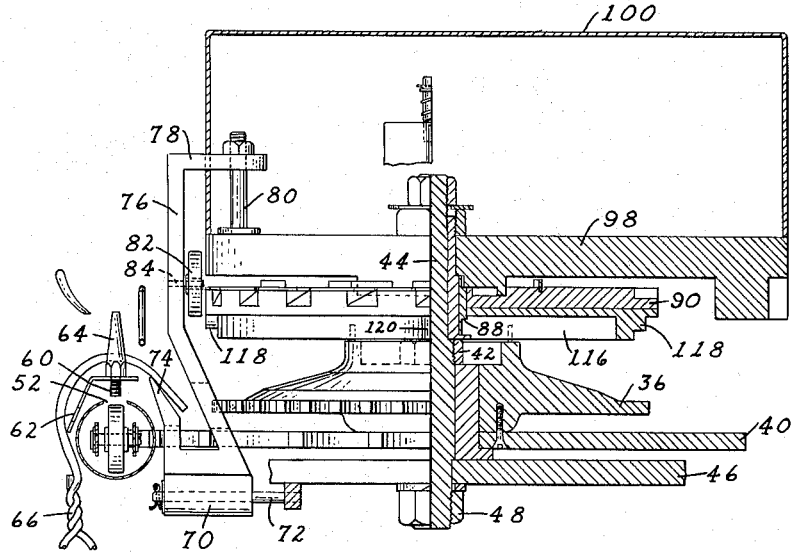
FIG. 3 is a sectional elevation taken on the lines 3—3 of FIG. 4.

Referring now to FIG. 3, the pinion gear 36 is keyed at 42 with a shaft 44, which also has keyed thereto, the gear 40 and the entire structure is secured to a plate 46 by an appropriate bolt 48.

The conveyor in part is composed of a tube 50 provided with a slot 52 in its upper surface. Within the interior of the tube is a chain-like arrangement composed of a multiplicity of interlocking U-shaped members 54, 54a, that form a continuous flexible conveyor. At their open ends, the members 54, 54a, support pins 56 that form bearings for discs 58, 58a. The discs 58 and 58a are preferably formed of molded plastic and constitute roller elements that engage the inner surface of the tube 50. As is readily observable in FIGS. 4 and 5, the U-shaped members 54, 54a, are at right angles to each other, so that adjacent discs 58 and 58a are, likewise, rotated at right angles with each other to alternately engage the sides, and the bottom of the tube 50. Projecting upwardly from each of the horizontally disposed rollers 58a is a threaded pin 60 which carries a bracket 62, and a cone-shaped projection 64. Each of the brackets 62, while not specifically shown, has an identifying index numeral or code designation stamped thereon to indicate a specific station on the conveyor between two cone-shaped projections 64, and forms a supporting surface for a conventional garment hanger 66, the spacing arrangement is clearly shown in FIGS. 4 and 5. It will, likewise, be evident in FIG. 4 that the gear teeth 68 of gear 40 are so spaced as to enter the conveyor chain and engage each of the succeeding horizontally disposed roller elements 58a, thereby forming a means of driving the conveyor.

As best seen in FIG. 3, an arm structure designated by reference character 70 is pivotally supported on a pin 72 that projects from the plate 46. This arm 70 has a short outer lip 74 that projects under a portion of the hook of the garment hanger 66. The arm 70 also has an upwardly projecting inner surface 76 that extends to a right angle portion 78, which carries a threadably adjustable stud 80 for adjusting the height or position of said arm 70. The inner surface 76 of the arm 70 also carries a roller 82 supported on a pin 84, which, as will be explained hereinafter, form a means of engagement by which the arm 70 is rotated on its pivotal connection 72. The arm 70 serves to lift a garment hanger 66 from the conveyor and elevate and transfer said hanger to a sidetrack 86.

Disposed about the shaft 44 and keyed to said shaft at 88 is a disc 90, which on its upper surface is provided with a multiplicity of radial slots 92. Disposed within each of the slots 92 is a slidable finger-like cam member 94. As will be evident in FIG. 4, the cams or fingers 94 are of differing lengths, there being five members making up each group, and therefore the members of one such group are designated as 94a, 94b, 94c, 94d and 94e. Each of said members 94 is provided with an upwardly projecting angular surface 96 that may be engaged by the pin 112 of an appropriate solenoid 102–110, when the proper solenoid is energized.

Also supported in surrounding relationship to the shaft 44 is a plate 98, forming a part of a housing 100, and on the upper surface of said plate 98 in penetrating relationship thereto are five solenoids designated as 102, 104, 106, 108 and 110. Each of the several solenoids is provided with a plunger 112, which when actuated engages one of the sloping surfaces 96 on one of the members 94 to move the selected member to an operative position. A coil spring 114 surrounds each plunger 112 to return the same to an inactive position.

Figure 6:
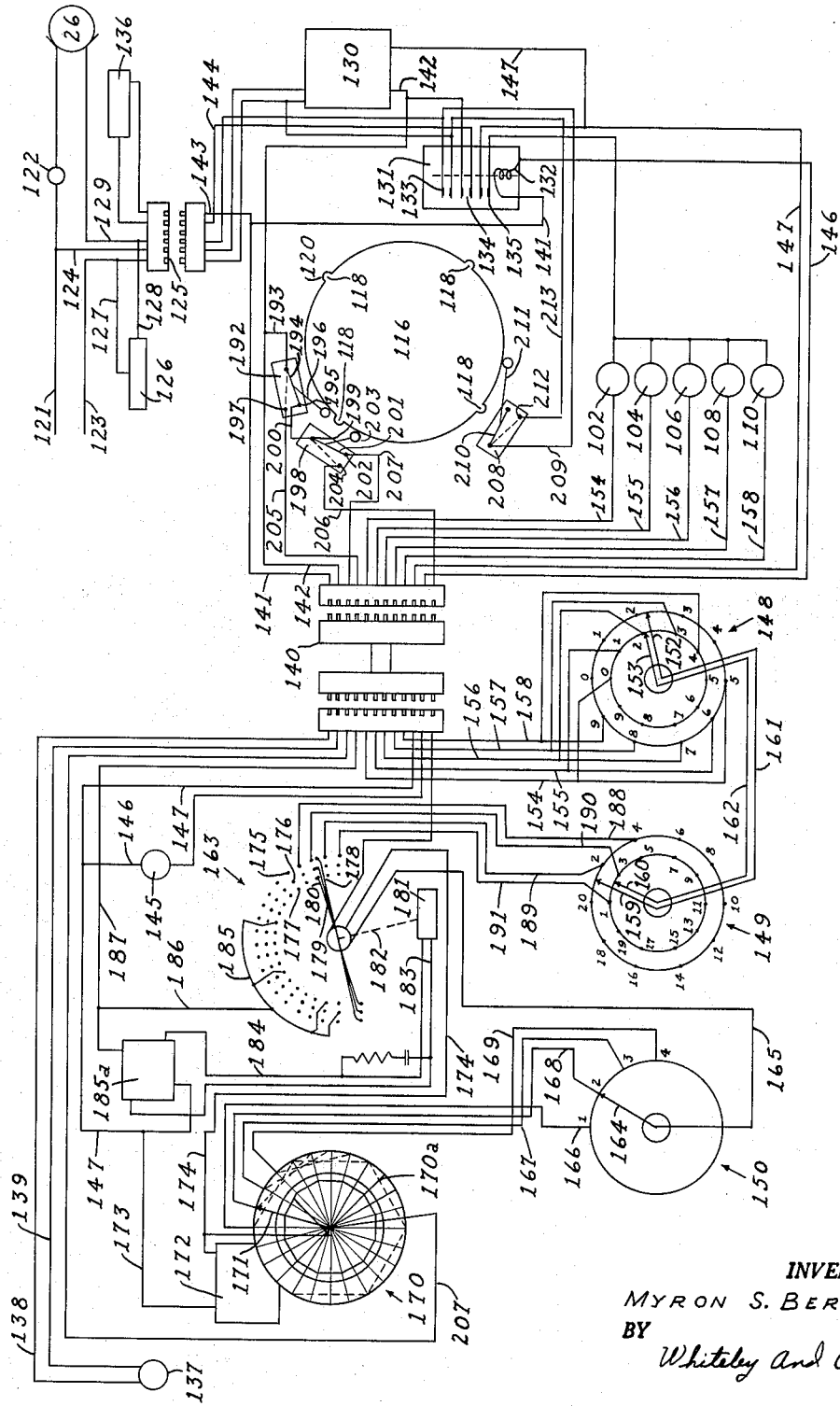
FIG. 6 is a diagram of an electrical circuit for controlling the operation of the invention disclosed in FIGS. 1–5.

Depending from the disc 90 is a circular timing plate 116 on the periphery of which are four equal cam dwells 118, and a longer single cam dwell 120, that are clearly visible in FIGS. 3, 5 and 6. The cam dwells 118 and 120 are provided for actuating certain switches shown in FIG. 6, to be discussed hereinafter.

As best seen in a dotted line configuration in FIG. 4 is a cam surface 122 disposed on the lower surface of the plate 90, which has the function of returning within the periphery of the disc 90 any of the members 94 that are projected by the action of the several solenoids 102–110.

Referring now to FIG. 6, is disclosed the control circuit for the operation of the conveyor. A conductor 121 extends from a source of commercial power to motor 26 and contains a main switch 122. A conductor 123 also extends from said source of commercial power, and together with a branch 124 from conductor 121, extends to a terminal block 125. A foot operated switch 126 is connected by a branch 127 with the power conductor 123, and by a branch 128 to a conductor 129, which, in turn, is joined to the other pole of motor 26 and to block 125. The two power conductors 123, 124, extend through the block 125 to the primary side of a transformer 130. A relay 131 contains an induction coil 132 and three sets of contacts identified as 133, 134 and 135. The contacts 133 control the high voltage current for the operation of motor 26. The contacts 134 are associated with the starting circuit for motor 26 and also control a garment trip switch 136, disclosed in FIG. 1, for terminating the operation of the conveyor motor. The contacts 135 control the several solenoids 102–110. A manual starting switch 137, seen at the extreme left of the figure, is joined by a pair of conductors 138, 139, that extend to a junction box 140, where they are respectively joined to a conductor 141 that extends to one side of the relay coil 132, and a conductor 142, which extends to one side of the secondary coil of transformer 130 and is connected to one of the contacts 134. A branch conductor 143 extends from conductor 141 through the block 125 to the trip switch 136. A conductor 144 extends from the other relay contact 134 to the trip switch 136.

To manually break the circuit to motor 26 for emergency purposes, a stop switch 145 is connected in a conductor 146 which is joined to the other side of the relay coil 132. A conductor 147 extends from the other side of the secondary of transformer 130 to one of the contacts 135, and to a junction with conductor 146.

To initiate the operation of motor 26, starting switch 137 is manually closed to complete a circuit, which may be traced as follows: From the power conductors 121, 123, current flows into the pimary side of the transformer 130, and through the conductor 142, extending from the secondary side of said transformer, low voltage current flows through the block 140 to the starting switch 137, and thence returns through conductor 141 to one side of the relay coil 132, and thence through the conductor 146 to the stop switch 145, whence the current returns through the conductor 147 to the other side of the secondary of transformer 130. When this occurs, the armature of the relay 131 closes the several sets of contacts and high voltage current flows from conductor 123 through contacts 133 and conductor 129 to motor 26, whence said motor puts the conveyor chain in motion. The circuit just described may be broken by the operation of the manual switch 145, or the main switch 122.

The operation of the five solenoids 102–110 to preselect the contents from a predetermined station on the conveyor, is controlled by three manually settable dials indicated by general reference numerals 148, 149 and 150. These three dials are located on a control console 151, shown in FIG. 1. The dial 148 is in a unit dial; while the dial 149 is a tens dial; and dial 150 is a hundreds dial. As disclosed, the control console 151 is arranged to control four hundred stations, which correspond to the number of stations on the conveyor. As seen in FIG. 6, the control device 148 is provided with manually settable switches 152, 153, that are arranged on two levels, and adapted to be set with respect to a series of contacts. Each series of contacts of the control 148 is numbered zero through nine. One conductor extends from each pair of aligned contacts of the control 148 through the junction box 140 to selected solenoids of the groups 102–110. It will be noted that each solenoid may be energized from two of the contacts of control 148. Thus, the stations zero and five are joined to a conductor 154 which extends to solenoid 102; stations one and six are joined to conductor 155 that extends to solenoid 104; stations two and seven are joined to conductor 156 that extends to solenoid 106; stations three and eight are joined to conductor 157 that extends to solenoid 108; stations four and nine are joined to conductor 158 that extends to solenoid 110.

The control 149 is composed of two manually rotatable switches 159, 160, each of which is located on an individual level, but which, like the switches 152, 153, are adapted to engage individual contacts numbered one through twenty. The switches 159, 152, are joined by a common conductor 161, and the switches 160, 153, are joined by a common conductor 162. Each of the twenty contacts of the control 149 are joined by separate conductors, only four of which are shown, to an outer row of arcuate contacts of a stepping switch indicated by general reference numeral 163 that will be described in detail hereinafter.

The control device 150 consists of a single movable switch 164 that is movable with respect to a series of individual contacts numbered one through four. A conductor 165 extends from the switch 164 to a conductor associated with stepping switch 163. From each of the four stationary contacts of the control device 150, individual conductors 166, 167, 168 and 169, extend to four stationary contacts on a second stepping switch indicated by the general reference numeral 170.

Stepping switch 170 is provided with twenty-four circumferentially arranged contacts, and it will be noted that jumper conductors 170a extend between every fifth contact. The stepping switch 170 is provided with a movable contact 171, which is moved in steps between the twenty-four contacts by an electrically actuated device 172. Current for the operation of the actuator 172 is supplied by a conductor 173 that constitutes a branch of conductor 147, and a second conductor 174, which extends to a portion of the first stepping switch 163.

The stepping switch 163 is composed of three arcuate rows of twenty contacts. The outer row of contacts is indicated by the common reference character 175, the intermediate row of contacts is indicated by the common reference character 176, and the inner arcuate row of contacts is indicated by the common reference character 177. The outer row of contacts 175 is adapted to be engaged by a movable switch 178. The intermediate row of contacts 176 is adapted to be engaged by a movable contact 179, and the inner row of contacts 177 is adapted to be engaged by a movable contact 180. The three movable switches or contacts 178, 179, and 180, are adapted to be moved with respect to the three arcuate rows of contacts by an electrical actuator 181, which is mechanically connected as indicated by dotted line 182. The actuator 181 is energized by a pair of conductors 183, 184, that receive direct current from a rectifier 185a.

Associated with the inner row of contacts 177 of the stepping switch 163 is a correcting circuit, which includes the conductor 185 that is joined to contacts 9, 14 and 19, of the inner row of contacts 177. A conductor 186 extends from the conductor 185 through a conductor 187 to supply current fo the actuators 172 and 181. The conductor 185 is also joined to the twentieth contact of the intermediate row of contacts 176 for energizing the "hundreds" actuator 172, to be explained hereinafter. As mentioned heretofore, an individual conductor extends from each of twenty of the contacts 175 through the stationary contacts of the control device 149, and for purposes of illustration only, four such conductors are disclosed and are indicated by reference characters 188, 189, 190 and 191.

As explained heretofore, rotary disc 116, which is driven during the movement of the conveyor, bears on its outer periphery four similar cam dwells 118, and one high cam dwell 120. Located in close relationship with the rotary disc 116 is a first switch 192 having an inlet conductor 193 which is joined to conductor 142. The switch contains a movable member 194 that normally engages a contact 195, but which upon movement of an actuator 196 engages a normally open contact 197. A second switch 198 contains a common conductor 199 joined by a jumper 200 to contact 195. Switch 198 contains a movable switch blade 201 that normally engages a contact 202, but which is movable by an actuator 203 into engagement with a normally open contact 204. The switch 192 is adapted to be actuated by the four cams 118. A conductor 205 extends from the normally open contact 197 through the junction 140, where it joins the conductor 187. The switch 198 is positioned approximately ten degrees about the periphery of the disc 116 from the switch 192 and is actuated by the cam dwell 120. Extending from the normally open contact 204 is a conductor 206, which joins the movable switch 180 that is adapted to engage the innermost row of contacts 177 of the stepping switch 163. A conductor 207 extends from the normally closed contact 202 through the junction 140, where it joins the movable switch of the control device 170.

Also closely associated with the disc 116 is a third switch 208 having a common conductor 209, which joins the high voltage circuit and is connected with conductor 129. The switch 208 contains a movable switch blade 210 that is operated by actuator 211, which also engages the cam dwells 118. The switch blade 210 is in a normally open position, but is adapted to be closed with respect to a contact 212. A conductor 213 extends from contact 212 to the other side of the high voltage circuit where it joins conductor 124. Switch 208 is merely a safety device which prevents the conveyor motor from being stopped while the actuator 196 of switch 192 is on one of the cam dwells 118, because such action would maintain an active circuit throughout other parts of the mechanism when such might not be desired.

The operation of the conveyor and its control system will now be explained. In the disclosure of FIG. 1, two independent conveyors are shown mounted in vertical spaced relationship with each other merely to illustrate the manner in which a limited amount of space may be utilized. It should be appreciated that a separate control console, such as console 151, is utilized with each conveyor. Furthermore, although the conveyor and control system disclosed herein is provided with 400 stations, that number may be either decreased or increased as desired by suitable modification of the hundreds control counter 150, and by minor modification of the stepping switch 170.

To synchronize the conveyor with the control system, the movable switch 171 of stepping switch 170 is moved to point number 1, and the three movable switches 178, 179, and 180, are set at the starting point, or zero point on the second stepping switch 163. Referring next to FIG. 4, the longest finger 94d of one set of cams is brought into alignment with the roller 82 that actuates the arm 70, and the conveyor chain itself is adjusted so as to bring position number "one hundred" into alignment with the end of arm 70 for the removal of a garment hanger 66 from station "one hundred" with the actuation of arm 70. In this manner, the control system is synchronized with the conveyor chain.

When soiled garments are received at the cleaning establishment, each is assigned a specific code designation or number, which is either kept in the books of the establishment or written or punched into a receipt card, which is given to the customer. When the garment is cleaned in the usual manner, it is placed into a suitable bag or cover as a protection against soil or dust, and the hanger which supports the garment is placed on the conveyor at the designated station. A switch 126, disclosed in FIGS. 1 and 6, is used to energize the conveyor circuit at the loading end of the conveyor for properly mounting the cleaned garments on one end of the conveyor. The conveyor thus serves as a storage area for the cleaned garments.

When the customer returns for the garments, the counter clerk merely adjusts the three dials 150, 149, and 148, to the designated code shown on the customer's receipt, or the records of the establishment, whereafter, by depressing the starting switch 137, the conveyor is placed in operation. It should be understood that with the rotation of disc 116 by the conveyor chain, each cam dwell 118, or each quadrant of the disc 116 represents the passage of five stations on the conveyor, and as each cam dwell 118 actuates the switch 192, the current is conveyed to the actuator 181 of the stepping switch 163 to cause the three movable switches 178, 179, and 180, to move one station with respect to the three arcuate rows of contacts 175, 176, and 177, thereby indicating the passage of five stations on the conveyor with each movement of the stepping switch 163, so that a total of one hundred stations on the conveyor is passed with each half rotation of the movable switches of the stepping switch 163. When the movable switch 179 engages the contact at the end of semi-circular row of arcuate contacts, a circuit is completed through the conductor 186 to the actuator 172 of the second stepping switch 170, causing the movable switch 171 to move one station of the hundreds counter stepping switch 170.

Assuming now that the desired garment is number 212, the hands or movable switches of the controls 148, 149, and 150, would be set in the positions shown, and after the stepping switch 163 had its movable switches 178, 179, and 180, pass twice through the semi-circular path, and the active end thereof engaging the second group of contacts, the solenoid 106 would be energized when the switch 178 contacted outer contact 175 of the second group through a circuit which will be traced as follows: Low voltage current would flow from conductor 142 through switch 192 to switch 198 and thence through the normally closed contact 202, through the conductor 207 to the movable switch 171 of the stepping switch 170, and thence through conductor 168 to the second contact of the dial 150, passing through the switch 164 to the conductor 165, and thence to the movable switch 178 of the stepping switch 163, from whence it would pass through the second contact 175 and through conductor 190 to the third contact of the control 149, passing through the movable switch 160, and the common conductor 162 through the movable switch 153 and the second inner contact through the conductor 156, passing through the junction 140 to the solenoid 106. When the solenoid 106 is energized, it engages the angular portion 96 of one of the cams 94, forcing said cam outwardly prior to the time that it engages the roller 82. When the roller 82 engages the selected cam 94, the lever 70 is rocked on its pivot 72 to engage the selected coat hanger 66 from station 212 on the conveyor and transfer it to the sidetrack 86, whence it passes along the sidetrack by gravity until it engages the tripping switch 136, which de-energizes the circuit through the relay coil 132 to thereby break the entire circuit.

Since it might be injurious to the solenoids if the switch actuator 196 was depressed by one of the cam dwells 118, without the motor being in operation, a safety switch 208 is provided to close the motor circuit for a short impulse to cause any cam dwell 118 to be moved out of engagement with the actuator 196.

Should there be a failure of the commercial current flowing through the conductors 121, 123, while the conveyor is in operation, this would, through the continued inertial movement of the conveyor mechanism, cause the conveyor to be thrown out of the synchronization with the stepping switch 163. Were this to occur, when the power was resumed, the circuit would be out of step with the conveyor, and to circumvent this possible condition, a correcting circuit has been provided consisting of the conductor 185 that is connected to the 9th, 14th and 19th contacts of the inner row of contacts 177 of the stepping switch 163. The actuator 181 is normally operated from the closing of switch 194 with the contact 197, and coincident with that action, current is supplied to the conductor 207 to the switch 180. If, therefore, switch 180 engages the 9th, 14th or 19th contact of the stepping switch 163 when current is not flowing through the conductor 205, a second impulse will be passed through the conductor 186 to give an additional actuation to the actuator 181 to bring the system back into synchronization, and it will be observed that in any one sweep of the switch 180 with respect to the inner row of contacts, three corrective steps may be taken.

It should be understood that while the drawings show only one garment hanger 66, disposed in each station of the conveyor between the upright cone-shaped members 64, but where a customer leaves two or three garments, each may be hung on an individual hanger and covered collectively by one envelope, or they may each be covered by separate envelopes and a small group of hangers disposed on one station of the conveyor between two adjacent members 64. In that event, the contents of the station of the conveyor is transferred to the sidetrack 86.

In the event that the establishment has only a minimum of floor space, the conveyor 10 may be used, and such conveyor can be supported from the ceiling of the space, so as to make the floor space available for other use. It will be noted that the loading end of this conveyor extends downwardly so that it can be loaded from the floor level, and since the side rail descends from the mechanism, delivery of the garments is not affected. On the other hand, where a great deal of storage space is required, the conveyors can be mounted in the manner shown in FIG. 1.

An important advantage of the invention is in the saving of valuable space within an establishment of the kind referred to herein.

Another advantage of the invention is the provision of a conveyor that forms a storage space for a large number of articles, together with a control circuit that operates the conveyor in such a manner as to bring the contents of a station of the conveyor to an access point for rapid delivery of the goods.

Another advantage resides in the provision of a conveyor and a siderail, together with means for selectively transferring from the conveyor to the siderail the contents of a particular station of the conveyor.

A further advantage resides in the provision of a storage conveyor for use in a cleaning establishment for quickly returning to customers garments which have been left at the cleaning establishment, after such garments are cleaned and ready for use.

As this invention is subject to numerous variations, which would be evident to those skilled in the art, it is not limited to the exact disclosure, but is defined in the terms of the appended claims.

I claim:

1. In combination with a continuous conveyor, means carried by said conveyor forming a multiplicity of individual article carrying stations, a single transfer member common to all article carrying stations supported adjacent said conveyor, a driving member operably connected to said conveyor, means controlled during the movement of said conveyor for actuating said single transfer member to transfer an article only from a preselected station on said canveyor when said station reaches a predetermined point in the path of movement of said conveyor and means determining the pre-selected station from the other stations.

2. A conveyor, comprising a flexible member supported for movement through a continuous path, means carried by said flexible member forming a multiplicity of individual stations on said flexible member, driving means operatively connected with said flexible member for moving the same through said continuous path, means forming a side path extending from said flexible member, and means controlled by the driving means during movement of said flexible member thereby for transferring to the side path an article carried by a selected station on said flexible member.

3. A delivery conveyor, comprising a continuous flexible member, driving means operably connected to said flexible member, a side rail contiguous to said flexible member, a transfer member operably associated with said flexible member and said side rail and adapted to transfer an article from said flexible member to said side rail, a control member driven by the driving means during its movement of said flexible member, and means controlled by said control member for actuating said transfer member when a preselected portion of said flexible member passes said transfer member.

4. A delivery conveyor, comprising a continuous flexible member, means carried by said flexible member forming a multiplicity of article carrying stations thereon, a transfer arm supported for pivotal movement adjacent said flexible member and adapted to lift an article from an individual station on said flexible member, a multiplicity of cam-like members supported for movement relative to said transfer arm, one of which is adapted to preselectively engage said transfer arm, a control member for actuating said cam-like member to engaging condition with said transfer arm, a control circuit including said control member, and switching means cooperable with said circuit and said control member for completing a circuit to said control member when a preselected station on said flexible member is abreast said transfer arm.

5. A delivery conveyor, comprising a flexible member, means carried by said flexible member forming a multiplicity of individual article carrying stations which traverse a closed path, a transfer member supported for movement adjacent said flexible member to remove an article from one of said stations, a motor adapted to actuate said transfer member, a circuit adapted to be pre-set for a specific station on said flexible member irrespective of the position of the specific station in the closed path, means for driving said flexible member, and switching means cooperable with said circuit and actuated during the movement of said flexible member for energizing said motor when a specific station on said flexible member approaches operative alignment with said transfer member.

6. A delivery conveyor, comprising a driven flexible member formed a multiplicity of article carrying stations thereon, a transfer member supported for movement relative to said flexible member to remove an article from a specific station thereon, a motor for actuating said transfer member, a circuit adapted to be pre-set for a specific station on said flexible member, a stepping switch in said circuit that completes the circuit to said motor when a specific station approaches operative alignment with said transfer member, and another switch in said circuit which is actuated during the movement of said flexible member for actuating said stepping switch.

7. In combination with a continuous conveyor traversing a closed path, means carried by the conveyor forming a multiplicity of article carrying stations; stations selector control means comprising independently settable members representing different orders of a multi-digit number or symbol; means driving said conveyor and control means; a transfer member supported adjacent said conveyor; and means operated by said control means during movement of said conveyor actuating said transfer member to transfer an article from the station representing said number when it reaches a predetermined point, any articles present in the other stations in the conveyor in advance of the station representing said number set on said member with respect to said point remaining therein.

8. In combination with a continuous conveyor, means carried by said conveyor forming a multiplicity of individual article carrying stations thereon; an article transfer means adjacent said conveyor common to all stations; a driving member operably connected to said conveyor; indicia bearing means for selecting a predetermined article bearing station of the multiplicity of article carrying station; and means driven during movement of the conveyor and coacting with said indicia means actuating said common article transfer means for transferring said article relative to said conveyor.

9. In combination with a continuous conveyor having means defining article carrying stations carried therewith and article transfer means adjacent said conveyor: a driving member operably connected to said conveyor; means selecting a predetermined station from which an article is to be transferred; and means connected with said last named means and also operated by said driving member actuating said article transfer means when said selected station is adjacent the transfer means.

10. In combination with a continuous conveyor having means defining article carrying stations carried therewith and article transfer means adjacent said conveyor: a driving member operably connected to said conveyor; means selecting a predetermined station relative to which an article is to be transferred; and means connected with the last named means and also operated by said driving member actuating said article transfer means when said selected station is adjacent the transfer means.

11. In a movable conveyor system having a plurality of article carrying stations movable in a closed path and article transfer means: a driving member operably connected to said movable conveyor, means for preselecting any one of the plurality of article carrying stations relative to which an article is to be transferred irrespective of the position of the carrying station in the path when preselection is made, and further means controlled during the movement of such conveyor for actuating said article transfer means to transfer an article from the preselected station on said conveyor once said station reaches a predetermined point in the path of movement of said conveyor.

12. The apparatus of claim 11, with means for initiating operation of said driving member following said preselection, and additional means initiating operation of said driving member independently of such preselection.

13. In combination with a continuous conveyor, means carried by said conveyor forming a multiplicity of individual article carrying stations traversing a closed path with such articles, an article transfer means supported adjacent said conveyor, a driving member operably connected to said conveyor, means controlled during movement of said conveyor for actuating said article transfer means to transfer an article from a preselected station on said conveyor when such station reaches a predetermined point in the path of movement of said conveyor, and means determining the preselected station from the other stations.

References Cited by the Examiner

UNITED STATES PATENTS

| | | | |
|---|---|---|---|
| 1,542,817 | 6/25 | Bernheim | 214—11 X |
| 1,730,382 | 10/29 | Posnick | 186—1.2 |
| 1,919,934 | 7/33 | Donaldson | 214—11 X |
| 2,113,308 | 4/38 | Morton | 214—16.16 X |
| 2,636,622 | 4/53 | Saxe | 214—11 |
| 2,717,086 | 9/55 | Bush. | |
| 2,771,980 | 11/56 | Parducci et al. | 198—27 |
| 2,947,407 | 8/60 | Wood | 186—1.2 |

SAMUEL F. COLEMAN, *Primary Examiner.*

ERNEST A. FALLER, KARL J. ALBRECHT,
*Examiners.*